May 27, 1941.  F. O. HESS  2,243,704
GAS MIXING MACHINE
Filed Oct. 6, 1937  4 Sheets-Sheet 2

INVENTOR
FREDERIC O. HESS
BY
John E. Hubbell
ATTORNEY

May 27, 1941.   F. O. HESS   2,243,704
GAS MIXING MACHINE
Filed Oct. 6, 1937   4 Sheets-Sheet 3

INVENTOR
FREDERIC O. HESS
BY
ATTORNEY

Patented May 27, 1941

2,243,704

UNITED STATES PATENT OFFICE 2,243,704

GAS MIXING MACHINE

Frederic O. Hess, Philadelphia, Pa., assignor to The Selas Company, Philadelphia, Pa., a corporation of Pennsylvania Application October 6, 1937, Serial No. 167,495

10 Claims. (Cl. 48—186)

The general object of the present invention is to improve the construction and operation of machines, commonly referred to as "mixing machines," employed to mix fuel gas and air for combustion in definite proportions, and to compress the mixture and deliver the latter at a regulable pressure, which is appreciably above that of the atmosphere.

Different air and gas mixture ratios are required to meet different operating conditions. In some cases, the mixture desired is one containing the precise amount of air required for the complete combustion of the gas in the mixture, but the air and gas ratio in such a mixture depends upon, and needs to be varied in accordance with changes in the composition of the fuel gas. In some other cases, it is desirable that the mixture contain a certain definite air percentage, less than the full amount required for complete combustion of the mixture.

It is ordinarily desirable that whatever mixture is selected or required for a particular operation, should be constantly maintained. In general it is thus practically essential, that a mixing machine should be adjustable to vary the air and gas ratio in the mixture formed, and that with any particular adjustment, the said ratio should be substantially constant, notwithstanding variations in demand, or in other operating conditions, tending to produce a variation in said ratio.

In the design and operation of such apparatus, it is necessary to take account of the fact that atmospheric air ordinarily contains dirt, and that dirt in the air entering the mixer tends to clog and cause faulty operation of the mixture determining parts of the apparatus. In consequence, it is practically desirable to screen the air inlet of the mixture and thus reduce the amount of air entering, the mixer, and practically desirable also, to so form the mixer as to facilitate its cleaning at more or less frequent intervals. Moreover the screening of the air inlet results in a drop in the pressure of the air as it passes through the screen, which tends to increase as the screen clogs with dirt, so that the air pressure in the air chamber receiving the air coming through the screen is less than the pressure of the atmosphere by a small but variable amount.

A specific object of the invention is to provide improvements in the form and construction of the mixture regulating valve mechanism of the mixer, facilitating its manufacture and cleaning, and contributing to increased efficiency and reliability of its operation.

Another specific object of the invention is to provide a mixer with simple and effective indicating provisions, whereby a visual check on the operation and adjustment of the apparatus may be obtained, and the testing time required to adjust the machine to form a particular mixture is minimized.

Another specific object of the invention is to provide the apparatus with an improved governor regulating the delivery pressure of the mixture. The invention, in its preferred form, is characterized by the fact that the movable governor valve extends into proximity to the compressor delivery chamber and is protected against flow of the air discharged by the compressor into such engagement with the valve, as to interfere with the proper operation of the latter.

Another specific object of the invention is to provide the compressor with simple and effective air cooling provisions.

The various features of novelty which characterize my invention are pointed out with particularity in the claims annexed to and forming a part of this specification. For a better understanding of the invention, however, its advantages, and specific objects attained with its use, reference should be made to the accompanying drawings and descriptive matter in which I have illustrated and described a preferred embodiment of the invention.

The mixing machine shown in Figs. 1 to 5, comprises mixer and compressor sections A and B, respectively, mounted on a base member AB.

Figure 1:
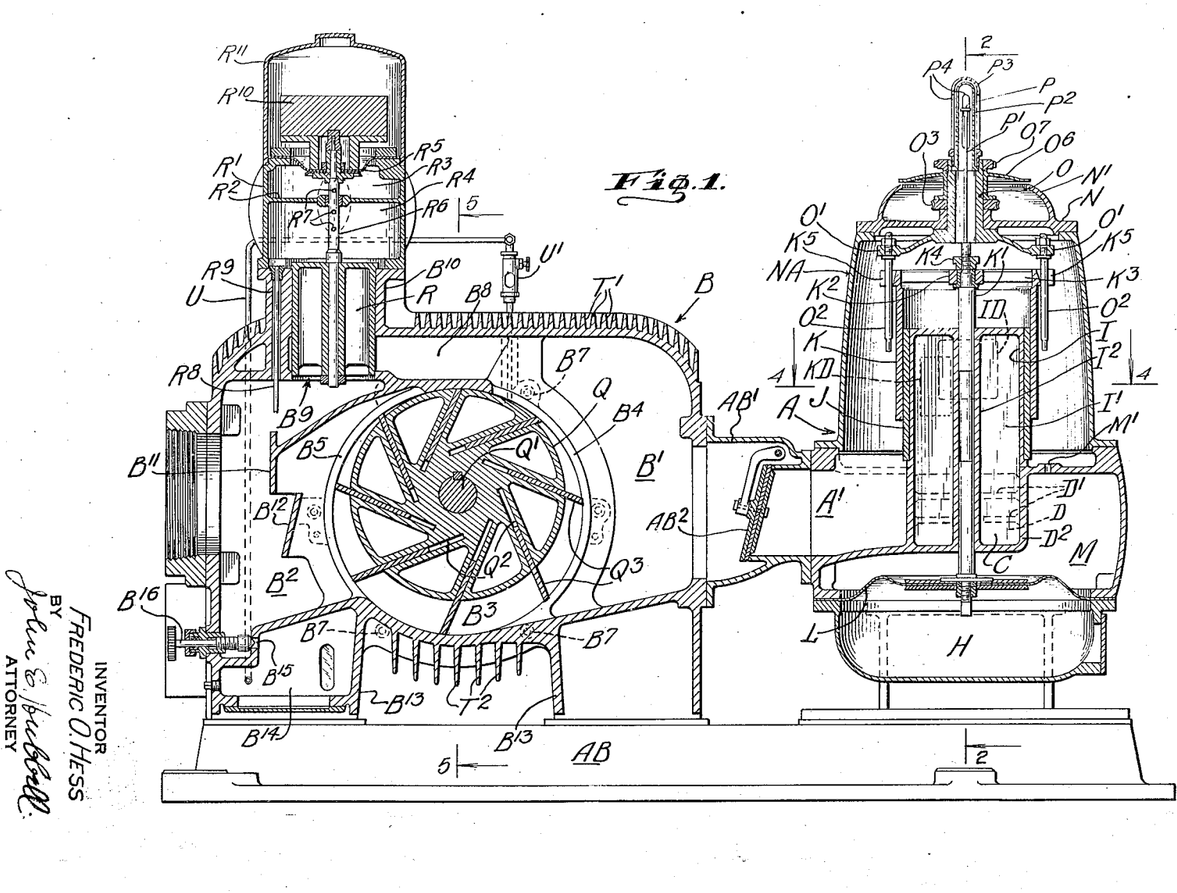
Fig. 1 is a vertical section through a mixing machine of preferred form.

The outlet A' of the mixer is connected to the inlet chamber B' of the compressor by a hollow part AB' interposed between the two sections, and in which is mounted a check valve AB², which automatically closes to prevent backflow from the compressor. The compressor section includes a pressure governor, regulating the air and gas mixture delivery pressure, and the mixer section includes, in addition to the air and gas mixing means proper, means for cleaning the air passing to the mixer and a gas pressure governor for maintaining a precise predetermined relation between the pressures in the air and gas inlet chambers of the mixer.

The mixer section A comprises air and gas inlet or supply chambers C and D, respectively, having body portions in horizontal alignment, and having side by side uprising delivery portions having walls in which are formed ports, the flow through which is variably throttled, as hereinafter described, to effect the desired air and gas mixture. Atmospheric air passes into the chamber C through an elbow shaped conduit C' having an uprising arm supporting a screen chamber C² receiving atmospheric air through a cylindrical screen C³, employed to arrest dirt carried by the air passing through the inlet. Horizontal blades or vanes C⁴ in the chamber C, desirably laminate the air flow through and prevent or minimize eddy currents, or flow disturbances, which would interfere with the desired accuracy of the mixing operation. The gas supply chamber D includes eddy preventing, flow laminating vanes or blades D', generally similar in form to previously mentioned vanes C⁴.

The chamber D receives gas at its outer end from the delivery chamber E' of a gas pressure governor E having an inlet chamber E², which is adapted to receive gas under a pressure somewhat above that of the atmosphere, from piping (not shown) which may be screwed into an internally threaded inlet nozzle E³. The chambers E' and E² are separated by a partition including a horizontal portion formed with a port E⁴ variably throttled by a vertically movable disc or poppet valve, F, which is automatically adjusted as required to maintain the desired relation between the air and gas pressures in the chambers C and D, respectively.

The adjusting means for the valve F, comprise a main governor diaphragm F², an auxiliary diaphragm F³ and a spring F⁴. The vertical stem F' of the valve F passes axially through, and is connected to the diaphragms F² and F³. The diaphragm F³ separates the chamber E² from a diaphragm chamber F⁶ beneath the diaphragm F². The diaphragm F² separates the chamber F⁵ from a chamber F⁶ of similar size and shape above the diaphragm. The spring F⁴ surrounds the upper portion of the stem F', and acts between a lower stationary abutment formed by the top wall of the chamber F⁶ and an adjustable abutment F⁷ formed by a nut threaded on the upper end of the stem F'. The spring F⁴ exerts a lifting force on the valve stem preferably a little greater than the opposing gravitational force so that the valve will seat positively and prevent backflow through the port E⁴ and chamber E², when otherwise conditions might result in such flow, balances the weight of the valve and parts connected to it. A tube F⁶ shown as of elbow shape and comprising a vertical portion opening to the chamber F⁵ through the bottom wall of the latter and a horizontal portion in the chamber E' and extending away from the vertical portion in the general direction of flow through the chamber E'. The tube F⁶ thus resembling a Pitot tube transmits to the chamber F⁵ a pressure equal to the static gas pressure in the chamber E' less a small amount dependent upon the velocity of the gas flow to substantially neutralize the bias valve seating force due to the excess of the spring force over the gravitational force acting on the valve past the open end of said horizontal portion, and preferably above it large enough with normal or average flow. A pipe FH connects the chamber F⁶ to a pressure equalizing chamber H, extending beneath the chambers C and D, and communicating with the air chamber C through a restricted passage H'. The chambers C, D, are formed in a hollow casting constituting the main body portion of the mixer structure and comprising an uprising central cylindrical portion I, enclosing the delivery portions of the chambers C and D. The latter are separated by a vertical partition I', extending downward between the aligned body portions of the chambers C and D. The partition I' comprises a central vertical tubular portion I².

The mixer supply chambers C and D communicate with the mixer outlet or mixture chamber A' through flow passages which include openings IC and ID in the opposite sides of the casing portion I and which are variably throttled by a tubular or sleeve valve K which surrounds the casting portion I. To facilitate the easy and accurate construction of the apparatus, a machined sleeve member J is shrunk or otherwise tightly secured on the vertical casting part I, and is formed with ports JC and JD which are respectively in register with the openings IC and ID. The cylindrical body portion of the tubular valve K snugly surrounds the sleeve J, and is movable relative thereto in the direction of, and also angularly about, their common axis and is formed with ports KC and KD, which are shown as of about the size or areal extent of the ports JC and JD.

Figure 4:
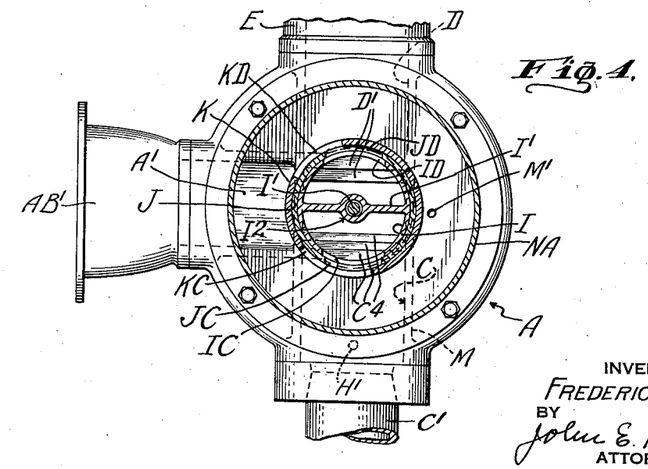
Fig. 4 is a plan section on the line 4—4 of Fig. 1.

In one position of the valve member K, the port KC is in register with the port JC, which is not then throttled, so that the flow capacity of the air flow passage then collectively formed by the opening IC and ports JC and KC, is determined by the area of the port JC. Any adjustment of the valve member K out of the position last mentioned will throttle the port JC to a certain extent. Similarly, in one particular position of the valve member K, the ports JD and KD will be in register and the minimum area of the gas flow passage then collectively formed by the opening ID and the ports JD and KD will be the area of the port JD. In any position of the member K, other than the last mentioned position, the port JD will be throttled more or less. As is shown clearly in Fig. 4, the ports JC, KC, JD and KD are so relatively arranged, that within the normal range of angular adjustment of the valve K, its adjustment in the clockwise direction as seen in Fig. 4, will increase the flow area of the gas passage including the port JD, and will decrease the flow area of the air passage including the port JC, while an angular adjustment of the valve K in the counterclockwise direction will increase and decrease the throttling effect of the valve K on the ports JD and JC, respectively. Through its normal range of vertical adjustment, down and up movements of the valve K, will respectively decrease and increase the flow capacities of the air and gas passages in the same proportion.

As shown, the valve K is connected at its upper end to a valve stem or spindle K' extending through and axially movable in the previously mentioned tubular portion $I^2$ of the mixer body casting. At its lower end, the spindle K' is secured to a diaphragm L forming the top wall of the previously mentioned pressure equalizing chamber H, and separating the latter from a second pressure equalizing chamber M in communication with the mixer outlet chamber A' through a small or restricted port M' in the partition separating the chambers A' and M. The spindle K' and valve K, are connected to permit their angular, and prevent their axial relative movement. As shown, the connection comprises a hub part $K^2$ connected to the body of the valve member K by integral spider arms $K^3$. Said hub portion $K^2$ is held against axial movement relative to the spindle K, the upper collar part being shown as a nut $K^4$ threaded on the spindle.

The means shown for angularly adjusting the valve K comprise a member O, having a tubular body portion, coaxial with the spindle K' and mounted for angular adjustment in the casing head member N which forms the top wall of the chamber A' and is supported by the casing member NA surrounding the main upper portion of the chamber A'. Rotation of the member O rotates the valve member K through a coupling connection comprising radial arms O' carried by the member O, and pins or shafts $O^2$ having their upper ends secured in the arms O'. The pins $O^2$ are parallel to each other and to the axis of the valve K, and extend through, and are slidingly received in bearing notches or guideways $K^5$, formed in externally projecting lug or ear portions of the member K. The means shown for angularly adjusting the member O, comprises a worm gear $O^3$ surrounding and secured to the member O, and a manually rotatable worm $O^4$ in mesh with the teeth of the gear $O^3$.

Figures 2, 3:
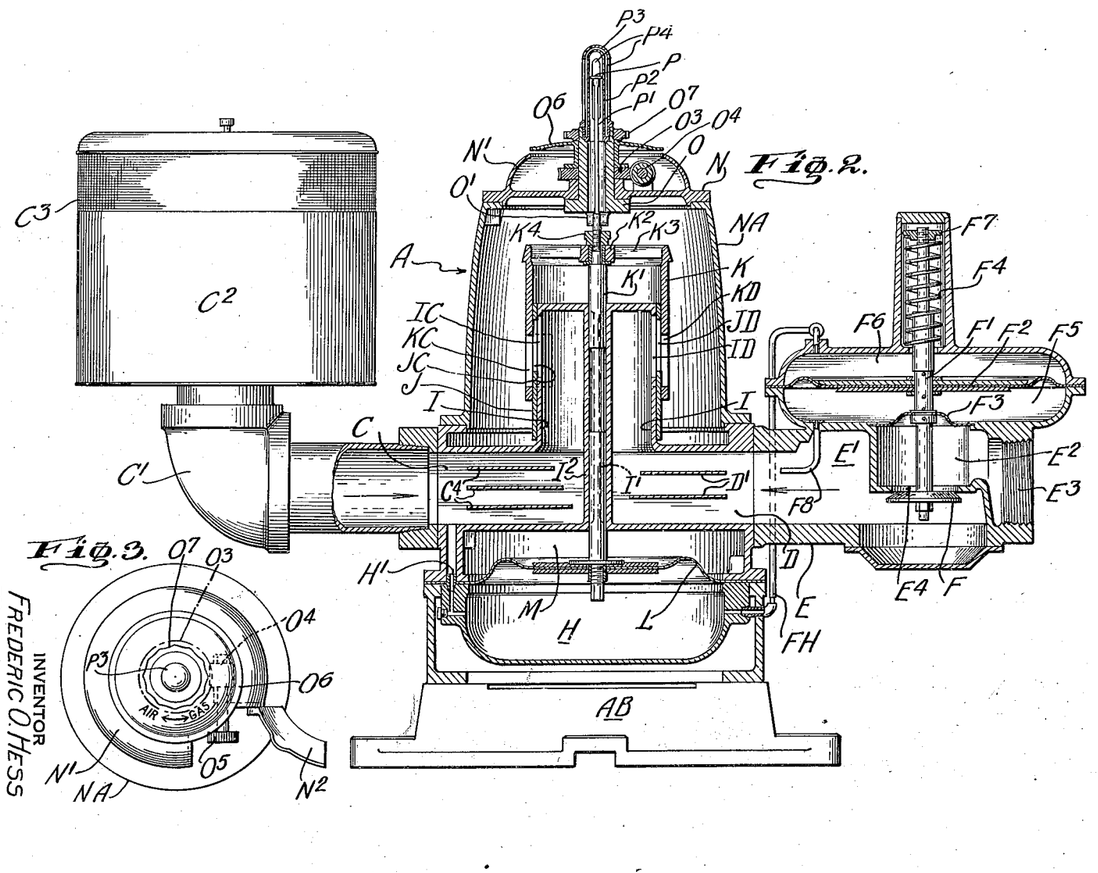
Fig. 2 is an elevation in section on the line 2—2 of Fig. 1.
Fig. 3 is a plan view of a portion of the apparatus shown in Fig. 2.

As shown, the gear $O^3$ and worm $O^4$ are in a chamber above the body of the head N and surrounded by an uprising, incurved extension N' of the member N. The wall N' is formed with a notch or opening normally closed by a door part $N^2$, which may be turned into an open position, as shown in Fig. 3, to make a knurled head $O^5$ on the worm shaft accessible for finger engagement and manipulation. As shown, a disc-like part $O^6$ carried by the member O substantially covers the top opening in the wall of the chamber surounded by the wall N'. The wall N' and disc part $O^6$ may be provided with marks, indicating the angular adjustment position of the valve member K, and the direction in which the disc $O^6$ and valve K should be turned to increase or decrease the air and gas ratio of the mixture formed by the apparatus.

As will be apparent, the volume of flow through the mixer section is a function of, and depends upon the vertical adjustment of the valve member K. An indication of that adjustment, and thereby of the volume of flow, is furnished by an indicator P, carried by a stem P' connected to the upper end of and forming an axial extension of the valve spindle K'. The indicator P is freely movable in a sight glass $P^2$, enclosing and coaxial with the indicator P. As shown, the sight glass $P^2$ is surrounded and protected by a tubular metallic guard member $P^3$ closed at its upper end and formed with vertical slits $P^4$ through which the indicator P may be seen. In the particular construction illustrated, the sight glass $P^2$ and guard member $P^3$ are mounted in the upper end of the tubular body portion of the member O, and a lock nut $O^7$ threaded on the upper end of such tubular body portion secures the disc part $O^6$ in place. As shown, the latter has an elongated hub portion bearing against the upper side of the worm gear $O^3$, the underside of the latter bearing against the upper end of a hub or central post portion of the member LN.

As shown, the major portion, or body, of the housing of the compressor section, is a one-piece casting including the peripheral wall of the rotor chamber $B^3$. The rotor chamber $B^3$ extends from one side to the other of the casing body, and is normally closed at its ends, by end heads $B^6$ detachably secured, as by bolts $B^7$ to the casing body. As shown, the axis of the chamber $B^3$ is horizontal. The rotor Q working in the chamber $B^3$, is a cylindrical metal casting, cored to reduce its weight and heat storage capacity, and is carried by a shaft Q'. The latter is parallel to, but displaced upwardly from the axis of the chamber $B^3$, so that the rotor Q engages the top portion of the peripheral wall of the chamber $B^3$, but is spaced away from said wall at the bottom of the chamber $B^3$.

As shown clearly in Fig. 1, the rotor Q is formed with a plurality of slots $Q^2$, tangential to a circle coaxial with and larger in diameter than the shaft Q', each of which extends through a point adjacent the center to the circumference of the rotor. In the construction shown, each slot is inclined at an angle of about 15°, or so, to a radial plane intersecting the slot at the circumference of each rotor body with the outer end of the slot angularly in advance, having reference to the direction of rotation, of the inner end of the slot. As shown, there are eight slots symmetrically disposed about the axis of the rotor.

Figure 5:
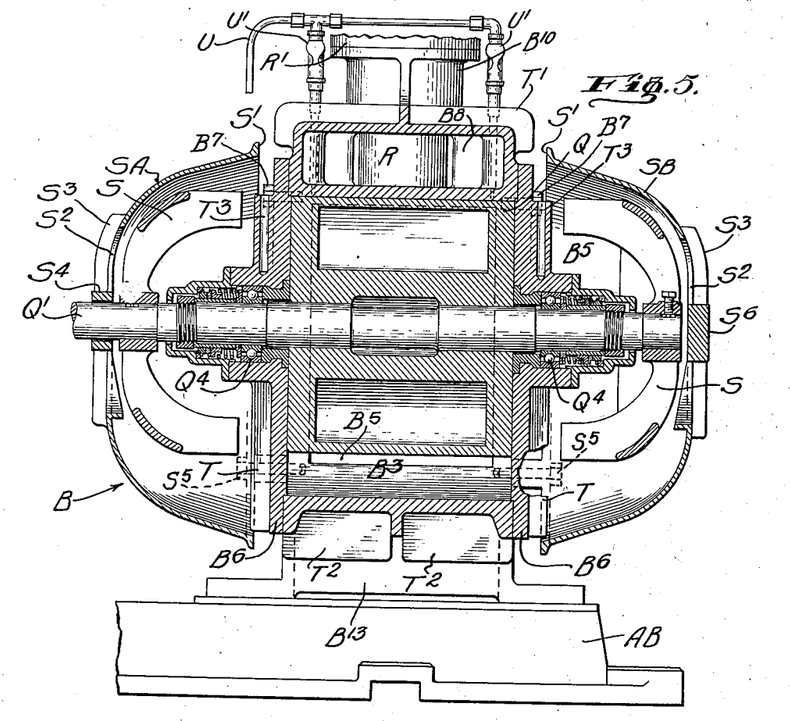
Fig. 5 is an elevation in section of the line 5—5 of Fig. 1.

A blade or vane $Q^3$, advantageously of fiber, bronze or other material having good wearing properties, is slidingly received in each slot $Q^2$. The rotor body and blades $Q^3$ extend for the full distance between the heads $B^6$ closing the ends of the rotor chamber, and the outer edge of each blade $Q^3$ extends into engagement with the peripheral wall of the chamber $B^3$. As is indicated in Fig. 5, the port $B^5$ does not extend to either end of the rotor chamber, and that is the case also with the port $B^4$, so that portions of the peripheral wall of the chamber are left at each side of each of said ports. Those portions are engaged by the vanes $Q^3$, and prevent the latter from moving outwardly beyond the cylindrical outline of the chamber $B^3$.

Advantageously and as shown, the motor shaft Q' is journalled in ball bearings $Q^4$ supported in the hub-like central portions of the end heads $B^6$, and so-called rotary seals are associated with each bearing to avoid leakage along the shaft.

The compressor casing body is formed with a passage $B^8$ connecting the chambers B' and $B^2$, constituting a by-pass to the connection between those chambers formed by the rotor chamber $B^3$ and the ports $B^4$ and $B^5$. The passage $B^8$ includes a portion above the outlet chamber $B^2$ and separated from the latter by a horizontal partition formed with a port $B^9$ constituting a part of the bypass passage.

The flow through the bypass passage $B^8$ is controlled by a valve member R. The latter forms a part of the compressor delivery pressure governor. As shown, the valve R is in the form of a cylinder having a closed upper end, and is slidingly received in a valve chamber in a hollow boss or tubular upper portion $B^{10}$ of the compressor casing body. Mounted on the upper end of the boss $B^{10}$ is a pressure governor body or casing R'. The latter is formed with a partition $R^2$, dividing its interior into upper and lower chambers $R^3$ and $R^4$, respectively. A substantial portion of the bottom wall of the chamber $R^4$ is formed by the closed end of the valve R. A similar portion of the top wall of the chamber $R^3$ is formed by a diaphragm $R^5$. The latter has its central portion connected to the spindle $R^6$ of the valve R. The spindle $R^6$ comprises an intermediate hollow portion formed with axially distributed ports $R^7$ in its shell, so that in all normal positions of the valve, the ports $R^7$ and the axial passage or bore of the hollow spindle, will provide a restricted communication between the chambers $R^3$ and $R^4$. The chamber $R^4$ is in communication with the delivery chamber $B^2$ of the compressor through a tube $R^8$ which is mounted in a vertical channel $R^9$ provided for the purpose in the wall of the valve chamber. The tube $R^8$, which can be removed for cleaning, or for replacement has its lower end well below the lower end of the channel $R^9$, and extends into the chamber $B^2$ and is not adjacent a wall of that chamber. In consequence the pressure in the tube $R^8$ is not subject to such variations due to flow in the compressor body, as is the pressure in the lower end of the channel $R^9$, for example.

Above the diaphragm $R^5$, the valve spindle $R^6$ supports a loading weight $R^{10}$ which determines the excess extent by which the delivery pressure exceeds the pressure of the atmosphere, the latter acting on the upper side of the diaphragm $R^5$. By replacement of the weight $R^{10}$ by a larger or small weight, the delivery pressure may be increased or decreased. As shown, the weight $R^{10}$ is enclosed by a cup shaped protective cover or casing part $R^{11}$. As a result of the restricted character of the communication between the chambers $R^3$ and $R^4$, the chamber $R^3$ acts as a dashpot chamber to prevent chattering or vibration of the valve member R.

Baffles or deflectors $B^{11}$ and $B^{12}$ within the outlet chamber $B^2$, and adjacent the upper portion of the latter are arranged to prevent the impingement against the governor valve R, of the pulsating discharge of air from the rotor chamber $B^3$ into the outlet chamber $B^2$.

The compressor section of the mixing apparatus is characterized by its novel and effective air cooling provisions. Those provisions include two fans S, carried by the rotor shaft, one at each side of the compressor, and fan housing members SA and SB, at the opposite sides of the compressor, and each uniting with the adjacent casing head member $B^6$ to form a suitable housing for the corresponding fan S. The housing member SA at the side of the fan at which the rotor shaft Q' is extended for connection to a driving motor, not shown, is cup-shaped with its axis substantially coincident with that of the rotor and has its rim or edge S' spaced away from the compressor housing to provide an annular outlet from the fan housing. The member SA is formed with an annular inlet $S^2$ adjacent and surrounding the rotor shaft Q'. As shown, the annular inlet $S^2$ is crossed by arms $S^3$ integrally connecting the body of the member SA to a central hub-like portion $S^4$ loosely surrounding the shaft Q'. The member SA is formed with bosses or projections $S^5$ suitably spaced along the rim S', which engage the adjacent end head $B^6$ and through which extend the screws securing the housing SA to said end head. The fan casing member SB is shown as exactly like the member SA, except that its central portion is not a tubular part, but a disc part $S^6$ extending across the end of the rotor shaft Q'.

The bulk of the air drawn in through the inlet openings of each fan casing is discharged at the top and the bottom of the latter, because of the flow defining effect of vertical fins T formed on the outer side of the adjacent end head $B^6$, and on the sides of the casing body proper. The relative shapes and dimensions of the fan housing and compressor casing are such that much of the air delivered from each fan housing moves along and between the adjacent horizontal ribs or fins T' and $T^2$, formed on top and bottom of the casing portion and extending in the direction of the rotor axis. The fins $T^2$ at the bottom are of especial importance, owing to the large amount of heat absorbed by the lower portion of the peripheral wall of the rotor chamber, by virtue of the fact that the compressing action proper is effected immediately above that wall portion, on the air in each air pocket or space adjacent thereto, formed by and between the lowermost vane $Q^3$, and the vane $Q^3$ immediately in front of the lowermost vane, as each such pocket moves toward the outlet chamber $B^2$. The vertical passages $T^3$ in the end heads shown in Fig. 5 are thermometer wells.

To facilitate a localized, concentrated cooling action at the underside of the peripheral wall of the chamber $B^3$, the housing body is advantageously formed with hollow pedestal portions $B^{13}$, separated by a space into which the fins $T^2$ project downwardly.

The compressor has lubricating provisions including an oil well $B^{14}$ in the front pedestal $B^{13}$, into which oil drains from the compressor chamber $B^2$ through a normally open port $B^{15}$ which may be closed by valve $B^{16}$ in filling the reservoir. An oil conduit U leads from the oil reservoir $B^{14}$ at a level below the normal oil level in the latter, to the rotor chamber of the compressor chamber, opening to the latter at a point at which the pressure is that of the inlet chamber B'. As the pressure in the delivery chamber $B^2$ is transmitted to the oil reservoir $B^{14}$, there is an available pressure head adequate to force oil continuously from the reservoir $B^{14}$ into the rotor chamber through conduit U. As shown, the latter is connected to the rotor chamber through a sight feed lubricator U', adjustable to vary the rate of oil feed.

Some of the advantages of the improved mixing machine shown in Figs. 1 to 5A have already been made apparent. The mixing machine, considered as a unit, is compact and of relatively small weight per unit of capacity. The air cooling provisions are simple and effective. The machine is easy to clean, and this is particularly true and important in the case of the mixer, in which accumulations of dirt carried into the mixer with the air and gas may interfere materially with the automatic up and down movement of the valve member K required to insure the uniformity in pressure drop in the flow passages including the openings IC and ID, and ports JC, JD, KC and KD, which is necessary to insure a proper air and gas ratio in the mixture. Continuous maintenance of the desired ratio is a matter of prime practical importance. Variations in the relative pressures in the air and gas inlet chambers C and D, and outlet chamber A' of the mixer tend to prevent the maintenance of a constant air and gas ratio. Such variations may result from variations in the resistance to flow through the air screen $C^3$, as a result of its partial clogging by dirt screened out of the air. Such variations may also result from the inclusion of a flow meter in the air supply line to the mixer.

By use of a sleeve valve surrounding a stationary cylinder formed with air and gas outflow ports variably throttled by angular and longitudinal adjustment of the external sleeve valve, I obtain important practical advantages over prior arrangements in which a movable sleeve valve has been located within a stationary cylindrical member formed with ports for the inflow of air and gas. The external sleeve valve is relatively easy and inexpensive to manufacture and clean, and with it a visual inspection of, and check on the accuracy with which the parts are constructed and assembled may be easily made. In addition to the direct reduction in manufacturing costs obtainable, it has been found that the use of the external sleeve materially reduces the testing time required to adjust the mixing machine so that it will maintain an accurate mixture ratio as the mixing load varies from full capacity load down to ½ of 1% thereof. With the external sleeve valve of the present invention, the angular adjustment of the valve may be effected through pins $O^2$ which may be spaced as widely apart as is necessary to minimize errors in the angular valve adjustment due to lost motion.

The scale marks on the disc $O^6$ or on the immediately adjacent stationary part provides a visual, easily read and accurate indication of the angular adjustment of the mixing valve. The movable indicating part P gives an easily read and fairly accurate indication of the volume of flow through the mixing machine. Thus, with the fluctuations normally occurring in the operation of air and gas mixers, the part $p$ will be in almost constant motion unless the valve has stuck and needs attention, so that failure of the part $p$ to move up and down when the mixing machine is in operation, is a good indication that the machine needs attention.

The described provisions for connecting the gas governor chamber $F^6$ to the air pressure equalizing chamber H, have been found conducive to efficient operation of the gas governor valve F. The vertical mounting of the pressure governor on the compressor body, contributes to compactness and economy in floor space, and to a governor disposition conducive to accuracy in its regulation effect.

Figures 5A, 6, 7:
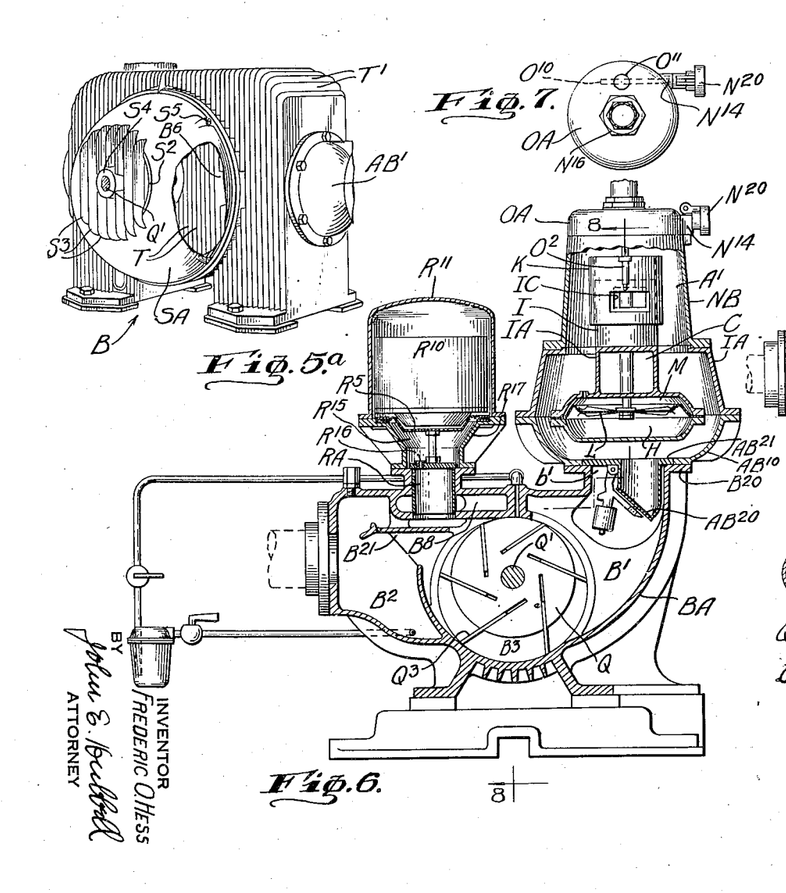
Fig. 5A is a perspective of the compressor shown in Fig. 1.
Fig. 6 is a vertical section of the mixing machine of modified form.
Fig. 7 is a plan view of a portion of the machine shown in Fig. 6.
Figure 8:
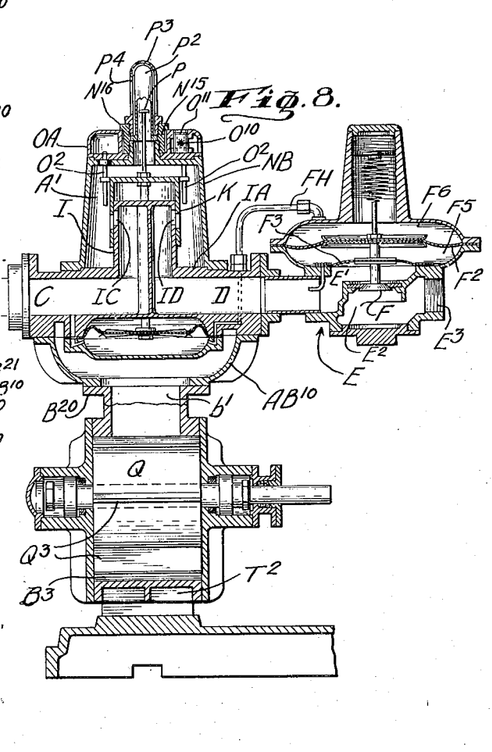
Fig. 8 is a section on the broken line 8—8 of Fig. 6.

In Figs. 6, 7 and 8, I have illustrated a type of air and gas mixing machine including most of the characteristic features of the previously described machine, but particularly adapted for use in units, of relatively small capacity, not provided with the special air cooling means of the machine first described. The mixing section of the machine shown in Figs. 6, 7 and 8, differs from that previously described, in the provisions made for angularly adjusting the sleeve valve K; in the omission of the sleeve member J, and in the form of the mixer and compressor body castings IA and BA, respectively.

The castings IA shown in Figs. 6 and 8, include no vanes in the chambers C and D, corresponding to the vanes $C^4$ and D' of the compressor first described. The bodies BA and IA are formed to permit the mixing section to be mounted directly above and supported on the compressor housing, which is formed with an opening $b'$ in the top wall of the inlet chamber B', said opening $b'$ being surrounded by an annular flange or shoulder $B^{20}$ forming a supporting seat for the connection casing $AB^{10}$. The latter is in the shape of a cup with a hole in its bottom, through which the mixing chamber A' communicates with the compressor chamber B'. The non-return valve $AB^{20}$, replacing the previously described valve $AB^2$, is pivoted to a part $AB^{21}$ having a disk like body portion engaging the shoulder $B^{20}$ adjacent its inner edge and formed with a tubular boss at its under side. The latter has its lower edge in a plane inclined to the horizontal and forming a seat for the valve $AB^{20}$.

In consequence of the omission of the sleeve J, the sleeve valve K of Figs. 6, 7 and 8 is fitted snugly about the vertical cylindrical casing part I of the body casting IA, and the ports IC and ID are accurately formed, so that they may be subjected to accurately graduated throttling effects by the vertical and rotative adjustments of the valve K. The latter is actuated and guided by means similar to those employed in the construction first described, except that the pins $O^2$ of Figs. 6 and 8 extend through slots in a horizontal top wall portion of the member NA forming the outer wall of the portion of the chamber A' above the casing IA. Furthermore, the pins $O^2$ of Figs. 6 and 8 are secured to the horizontal annular bottom portion of a chambered cap member OA. The latter is seated on the horizontal top wall portion of the member NB corresponding generally to the previously mentioned member NA, and is secured in place by a sleeve member $N^{15}$ in threaded engagement with a tubular boss extending upwardly from the horizontal top wall portion of the member NA. The sleeve $N^{15}$ forms a stationary shaft bearing on which the cap member OA is journalled, and is formed with an outwardly extending circumferential rib or flange $N^{16}$ at its top which engages the top wall of the member OA.

The means for angularly adjusting the cap member OA and thereby adjusting the valve K comprise a screw shaft $O^{10}$ provided with a horizontal knob at its outer end, and swivelled in an uprising projection $N^{14}$ from the member NB. The screw shaft $O^{10}$ is threaded through a threaded passage in a vertical cylindrical body or nut $O^{11}$ journalled in the cap member OA. As will be apparent, the rotation of the shaft $O^{10}$, angularly adjusts the member OA and thereby varies the ratio of the air and gas in the mixture formed. Unauthorized adjustments of the screw shaft $O^{10}$ may be prevented by securing to the mixer casing part $N^{14}$, a cover part $N^{20}$, which, when so secured, covers the knob at the outer end of the shaft $O^{10}$, and thereby prevents manual rotation of the latter.

The pressure governor valve RA shown in Fig. 6, is generally like the valve R, but the pressure in the chamber $B^2$ is transmitted to the governor chamber $R^{15}$ below the diaphragm $R^5$, through a restricted port $R^{16}$, formed in the upper end of the valve RA. The casing part $R^{17}$ of Fig. 6, corresponds generally to the casing part R' of the construction first described, includes no partition corresponding to the partition R² in the member R'. The pressure regulating weight R¹⁰ of Fig. 6 is enclosed by a cup member R¹¹, as in the construction first described.

In Fig. 6 a single horizontal baffle B²¹ serves the purpose of preventing the flow of air in the chamber B² from interfering with the proper operation of the by-pass valve RA, generally as the purpose is served in the construction first described by the baffles B¹¹ and B¹².

While in accordance with the provisions of the statutes, I have illustrated and described the best forms of embodiment of my invention now known to me, it will be apparent to those skilled in the art that changes may be made in the form of the apparatus disclosed without departing from the spirit of my invention as set forth in the appended claims.

Having now described my invention, what I claim as new and desire to secure by Letters Patent is:

1. In a gas mixing machine, the combination with a hollow cylinder enclosing two gas compartments and formed with a separate port in its peripheral wall for each compartment, of a sleeve valve surrounding, and movable axially of said cylinder to thereby similarly throttle and unthrottle said ports and movable angularly about the axis of said cylinder to increase and decrease the free flow area through one of said ports relative to that through the other, a casing cooperating with said cylinder to enclose a gas receiving space into which said ports open, a member angularly adjustable about said axis, and cooperating with said valve to prevent angular movement of said valve relative to said member, while permitting axial movement of said valve relative to said member, and pressure responsive means for axially adjusting said member as the volume of flow through said ports varies, as required to maintain an approximately constant pressure drop through said ports, notwithstanding variations in the volume of flow through said ports.

2. In a gas mixing machine, the combination with a hollow cylinder enclosing two gas compartments and formed in its peripheral wall with a separate opening to each compartment, of a tubular valve seat part surrounding and rigidly secured to said cylinder and formed with ports in register with said openings, a sleeve valve surrounding, and movable axially of said part to thereby similarly throttle and unthrottle said ports and movable angularly about the axis of said part to increase and decrease the free flow area through one of said ports relative to that through the other, a casing cooperating with said cylinder to enclose a gas receiving space into which said ports open, a member angularly adjustable about said axis, and cooperating with said valve to prevent angular movement of the latter relative to said member, while permitting axial movement of said valve relative to said member, and pressure responsive means for axially adjusting said member as the volume of flow through said ports varies, as required to maintain an approximately constant pressure drop through said ports.

3. In a gas mixing machine, the combination with a hollow cylinder enclosing two gas compartments and formed with a separate port in its peripheral wall for and opening to each compartment, of a sleeve valve surrounding, and movable axially of said cylinder to thereby similarly throttle and unthrottle said ports and movable angularly about the axis of said cylinder to increase and decrease the free flow area through one of said ports relative to that through the other, a member angularly adjustable about said axis and cooperating with said valve to prevent angular, while permitting axial, movement of said valve relative to said member, a casing part surrounding said cylinder and spaced away from the latter to provide a chamber receiving gases from said compartments through said ports, and including a transparent tubular portion coaxial with said cylinder, and an indicator part connected to said valve and extending into said tubular portion and giving a visible indication of the axial adjustment of said valve.

4. In a gas mixing machine, the combination with a hollow cylinder enclosing two gas compartments and formed with a separate port in its peripheral wall for and opening to each compartment of a sleeve valve surrounding, and movable axially of said cylinder to thereby similarly throttle and unthrottle said ports and movable angularly about the axis of said cylinder to increase and decrease the free flow area through one of said ports relative to that through the other, a member angularly adjustable about said axis and cooperating with said valve to prevent angular, while permitting axial, movement of said valve relative to said member, a casing part surrounding said cylinder and spaced away from the latter to provide a chamber receiving gases from said compartments through said ports, and formed with an opening coaxial with said sleeve and member, said member comprising a trunnion-like part extending through said opening, and means mounted on said casing part externally of said chamber for engaging and angularly adjusting said trunnion part.

5. In a gas mixing machine, the combination with a hollow cylinder enclosing two gas compartments and formed with a separate port in its peripheral wall for and opening to each compartment of a sleeve valve surrounding, and movable axially of said cylinder to thereby similarly throttle and unthrottle said ports and movable angularly about the axis of said cylinder to increase and decrease the free flow area through one of said ports relative to that from the other, a member angularly adjustable about said axis and cooperating with said valve to prevent angular, while permitting axial, movement of said valve relative to said member, a casing part surrounding said cylinder and spaced away from the latter to provide a chamber receiving gases from said compartments through said ports and formed with an opening coaxial with said sleeve and member, said member comprising a hollow trunnion-like part extending through said opening, and means mounted on said casing part externally of said chamber for engaging and angularly adjusting said trunnion part, and a transparent tubular part coaxial with and open at one end to the bore of said trunnion part and closed at its other part and an indicator connected to and sharing the axial movements of said valve and extending through said trunnion part into, and visible through the wall of, said transparent part.

6. In a gas mixing machine, the combination with a hollow cylinder enclosing two gas compartments and formed with a separate port in its peripheral wall for and opening to each compartment of a sleeve valve surrounding, and movable axially of said cylinder to thereby similarly throttle and unthrottle said ports and movable angularly about the axis of said cylinder to increase and decrease the free flow area through one of said ports relative to that from the other, a member angularly adjustable about said axis and cooperating with said valve to prevent angular, while permitting axial movement of said valve relative to said member, and having an operating portion, a casing part enclosing said cylinder and spaced away from the latter to provide a chamber receiving gases from said compartments through said ports, and formed with an opening through which the said operating portion of said member extends, and means mounted on said casing part externally of said chamber, in engagement with said operating portion and operable to angularly adjust said valve.

7. In a gas mixing machine, the combination with a hollow cylinder enclosing two gas compartments and formed with a separate port in its peripheral wall for and opening to each compartment of a sleeve valve surrounding, and movable axially of said cylinder to thereby similarly throttle and unthrottle said ports and movable angularly about the axis of said cylinder to increase and decrease the free flow area through one of said ports relative to that from the other, a member angularly adjustable about said axis and cooperating with said valve to prevent angular, while permitting axial movement of said valve relative to said member, and having an operating portion, a casing part enclosing said cylinder and spaced away from the latter to provide a chamber receiving gases from said compartments through said ports and formed with an opening through which the said operating portion of said member extends, and means mounted on said casing part externally of said chamber, and gear connected to said operating portion and operable to angularly adjust said valve.

8. In a gas mixing machine, the combination with air and gas compartments comprising adjacent portions, each having an outlet port, a common valve member for simultaneously varying the area for flow through the two ports, a conduit for the passage of air into the air compartment including spaced apart partition parts extending parallel to one another and to the flow through said conduit for dividing said flow into a plurality of parallel streams, and a gas pressure regulator having its outlet connected to the gas compartment, and having a gas flow controlling valve, and means for adjusting said valve as required to maintain a pressure in said gas compartment approximately equal to the pressure in said air compartment.

9. In a gas mixing machine, the combination with a casing element in the form of a hollow T comprising a cylindrical stem portion with a partition extending longitudinally thereof and separating the space therein into separate air and gas compartments, and formed with a passage extending axially through said stem, the portions of said T extending transversely away from said stem at opposite sides of said portion, being hollow and forming the respective inlet portions of the two compartments, said stem portion having an outlet port for each compartment formed in a corresponding portion of its peripheral wall, a sleeve valve surrounding and adjustable axially of said stem portion to variably throttle said ports, a rod extending through said passage and connected at one end to said valve, means including a movable wall connected to the opposite end of said rod, and exposed at its opposite sides to pressures at the inlet and outlet sides, respectively, of one of said ports, and adapted to adjust said valve as required to maintain an approximately constant difference between said pressures, notwithstanding variations in the amount of flow through said ports.

10. In a gas mixing machine, the combination with a casing element in the form of a hollow T comprising a cylindrical stem portion with a partition extending longitudinally thereof and separating the space therein into separate air and gas compartments, the portions of said T extending transversely away from said stem portion at opposite sides thereof, being hollow and forming the respective inlet portions of the two compartments, and having parallel partitions extending longitudinally of said inlet portions and transversely to said stem portion, said stem portion having an outlet port for each compartment formed in a corresponding portion of its peripheral wall, and a sleeve valve surrounding and adjustable axially of said stem portion to variably throttle said ports.

FREDERIC O. HESS.